US010648221B2

(12) United States Patent
Liu et al.

(10) Patent No.: US 10,648,221 B2
(45) Date of Patent: May 12, 2020

(54) COMPACT ADJUSTABLE POCKET DOOR FRAME

(71) Applicant: MOULURE ALEXANDRIA MOULDING INC., Alexandria (CA)

(72) Inventors: Fuzhong Liu, Alexandria (CA); Luc Titley, Alexandria (CA); Jerry Chabot, Alexandria (CA); Laurence Low, Alexandria (CA); Roch Hurtubise, Alexandria (CA); Sean Cadney, Quebec (CA)

(73) Assignee: MOULURE ALEXANDRIA MOULDING INC., Alexandria, Ontario (CA)

( * ) Notice: Subject to any disclaimer, the term of this patent is extended or adjusted under 35 U.S.C. 154(b) by 177 days.

(21) Appl. No.: 15/867,596

(22) Filed: Jan. 10, 2018

(65) Prior Publication Data

US 2019/0178022 A1 Jun. 13, 2019

(51) Int. Cl.

*B60J 1/16* (2006.01)
*E06B 3/46* (2006.01)
*E06B 1/52* (2006.01)

(52) U.S. Cl.

CPC .............. *E06B 3/4654* (2013.01); *E06B 1/52* (2013.01)

(58) Field of Classification Search

CPC ................................. E06B 1/52; E06B 3/4654
USPC ............. 49/323, 372, 374; 52/205, 207, 217
See application file for complete search history.

(56) References Cited

U.S. PATENT DOCUMENTS 2,561,079 A * 7/1951 Trammell, Sr. ....... E06B 3/4654 49/372
3,494,076 A 2/1970 Todd
4,325,204 A * 4/1982 Martine ................ E06B 3/4654 49/372
4,671,012 A * 6/1987 Merklinger ............... E06B 9/01 49/55
6,058,655 A * 5/2000 Gravel ...................... B60P 7/14 49/306
7,331,149 B2 * 2/2008 Tollenaar .............. E04B 2/7457 52/481.1
2009/0056228 A1 * 3/2009 Picchio ............... E05D 15/0617 49/415

(Continued)

FOREIGN PATENT DOCUMENTS

CA 2310869 A1 * 12/2000 ........... A47B 96/027
CA 2788914 A1 3/2014

(Continued)

*Primary Examiner* — Jerry E Redman

(74) *Attorney, Agent, or Firm* — Loza & Loza, LLP; Heidi L. Eisenhut

(57) ABSTRACT

It is contemplated that the present invention provides a preassembled pocket door frame including a first vertical member, a second vertical member, an intermediary member having a vertically extending central slot, an upper member horizontally extending between the first vertical member and the second vertical member, and at least a pair of transverse braces, each transverse brace extending horizontally between the intermediary member and the second vertical member, each transverse brace having a moveable coupler operable such that each transverse brace is movable from a first, stowed position to a second, generally orthogonal position.

14 Claims, 8 Drawing Sheets

(56) References Cited

U.S. PATENT DOCUMENTS

| | | | | |
|---|---|---|---|---|
| 2014/0075853 | A1* | 3/2014 | Keller | E05B 65/006<br>52/79.7 |
| 2014/0075863 | A1 | 3/2014 | Laronde | |
| 2017/0051554 | A1* | 2/2017 | Dastrup | E06B 3/4654 |

FOREIGN PATENT DOCUMENTS

| | | | | | |
|---|---|---|---|---|---|
| CA | 2823357 | A1 | * | 3/2014 | E06B 1/045 |
| CA | 2978092 | A1 | * | 9/2016 | E05F 5/003 |
| EP | 0417000 | A1 | * | 3/1991 | E05D 15/063 |
| EP | 2098669 | A1 | * | 9/2009 | E05D 15/063 |
| GB | 512356 | A | * | 9/1939 | E06B 3/385 |

* cited by examiner

COMPACT ADJUSTABLE POCKET DOOR FRAME

FIELD

The present invention relates to commercial and residential construction. More specifically, the present invention relates to prefabricated pocket door frames that can be tightly and efficiently packaged yet quickly and easily installed onsite in a predictable and repeatable way.

BACKGROUND

Sliding pocket doors are commonly employed architectural features that offer a way to provide a door for an opening in a confined space that would not permit a traditional swinging door.

Pocket doors require the construction of an effectively false or hollow wall that contains a cavity (i.e.: a "pocket") that can fully receive the sliding door in the opened position so that door is hidden from view. Given the additional complexity that a pocket door presents commercial and residential builders, a number of prefabricated pocket door kits have been developed that can be quickly installed without requiring that a carpenter or skilled craftsman design, measure, cut, build and install the frame components on a job-by-job, custom basis.

Moreover, given that door openings can come in a variety of widths, a number of adjustable width pocket door frames have been developed that can accommodate sliding pocket doors of a number of widths. In this way, a single pocket door frame kit can be used for a number of applications where the opening in question is of differing widths.

For example, U.S. Pat. No. 3,494,076 to Todd discloses an adjustable pocket door frame. However, Todd does not disclose an adjustable-width pocket door frame that is fully collapsible without requiring significant disassembly and as such the shipping, storage and retailing costs of an adjustable pocket door frame as disclosed by Todd would be significant.

US Patent Application No. 2014/0075863 to Laronde also discloses an adjustable pocket door frame. However, Laronde does not disclose an adjustable-width pocket door frame that is fully collapsible without requiring significant disassembly and as such the shipping, storage and retailing costs of an adjustable pocket door frame as disclosed by Laronde would also be significant.

Finally, Canadian Patent Application No. 2,788,914 to William et al. also discloses another version of an preassembled adjustable pocket door frame. However and similar to Laronde and Todd as discussed above, William does not disclose an adjustable-width pocket door frame that is fully collapsible without requiring significant disassembly and as such the shipping, storage and retailing costs of an adjustable pocket door frame as disclosed by William et al would also be significant.

Therefore, each of Todd, William et al. and Laronde disclose preassembled pocket door frames that do not completely disassemble in order to create the smallest possible packaged state which results in significant shipping costs and further requires significant storage and retail space.

Accordingly, there is a need for a preassembled pocket door frame that can be quickly and easily installed onsite and which can be collapsed into the smallest possible packaged state in order to reduce shipping, storage and retailing costs.

BRIEF SUMMARY

It is contemplated that the present invention can provide a preassembled pocket door frame that can be quickly and easily installed onsite and which can be collapsed into the smallest possible packaged state in order to reduce shipping, storage and retailing costs.

In at least one embodiment, the present invention provides a preassembled pocket door frame having a first vertical member vertically extending between an upper end and a lower end, a second vertical member vertically extending between an upper end and a lower end, an intermediary member vertically extending between an upper end and a lower end and having a vertically extending central slot, the vertically extending central slot extending between the upper end of the intermediary member and the lower end of the intermediary member, an upper member horizontally extending between the first end of the first vertical member and a first end of the second vertical member, and at least a pair of transverse braces, each transverse brace having a first end and a second end and extending horizontally between the intermediary member and the second vertical member, each transverse brace having a moveable coupler mounted to at least one of the first end of the transverse brace and the second end of the transverse brace, the movable coupler operable such that each transverse brace is movable from a first, stowed position to a second, generally orthogonal position, such that each transverse brace is oriented generally orthogonally to the intermediary member and the second vertical member and one of the first end of the transverse brace and the second end of the transverse brace abuts the second vertical member and the other of the first end of the transverse brace and the second end of the transverse brace abuts the intermediary member in the second, generally orthogonal position.

In at least one embodiment, the present invention provides a preassembled pocket door frame kit having a track component, and a sliding door, the sliding door being generally planar and having an upper surface including a track, the track adapted to slidingly engage with the track component, a preassembled pocket door frame having a first vertical member vertically extending between an upper end and a lower end, a second vertical member vertically extending between an upper end and a lower end, an intermediary member vertically extending between an upper end and a lower end and having a vertically extending central slot, the vertically extending central slot extending between the upper end of the intermediary member and the lower end of the intermediary member, an upper member horizontally extending between the first end of the first vertical member and a first end of the second vertical member, and at least a pair of transverse braces, each transverse brace having a first end and a second end and extending horizontally between the intermediary member and the second vertical member, each transverse brace having a moveable coupler mounted to at least one of the first end of the transverse brace and the second end of the transverse brace, the movable coupler operable such that each transverse brace is movable from a first, stowed position to a second, generally orthogonal position, wherein each transverse brace is oriented generally orthogonally to the intermediary member and the second vertical member and one of the first end of the transverse brace and the second end of the transverse brace abuts the second vertical member and the other of the first end of the transverse brace and the second end of the transverse brace abuts the intermediary member in the second, generally orthogonal position.

BRIEF DESCRIPTION OF THE DRAWINGS

The present invention will be better understood in connection with the following Figures, in which.

DETAILED DESCRIPTION OF THE EMBODIMENTS

Figure 1:
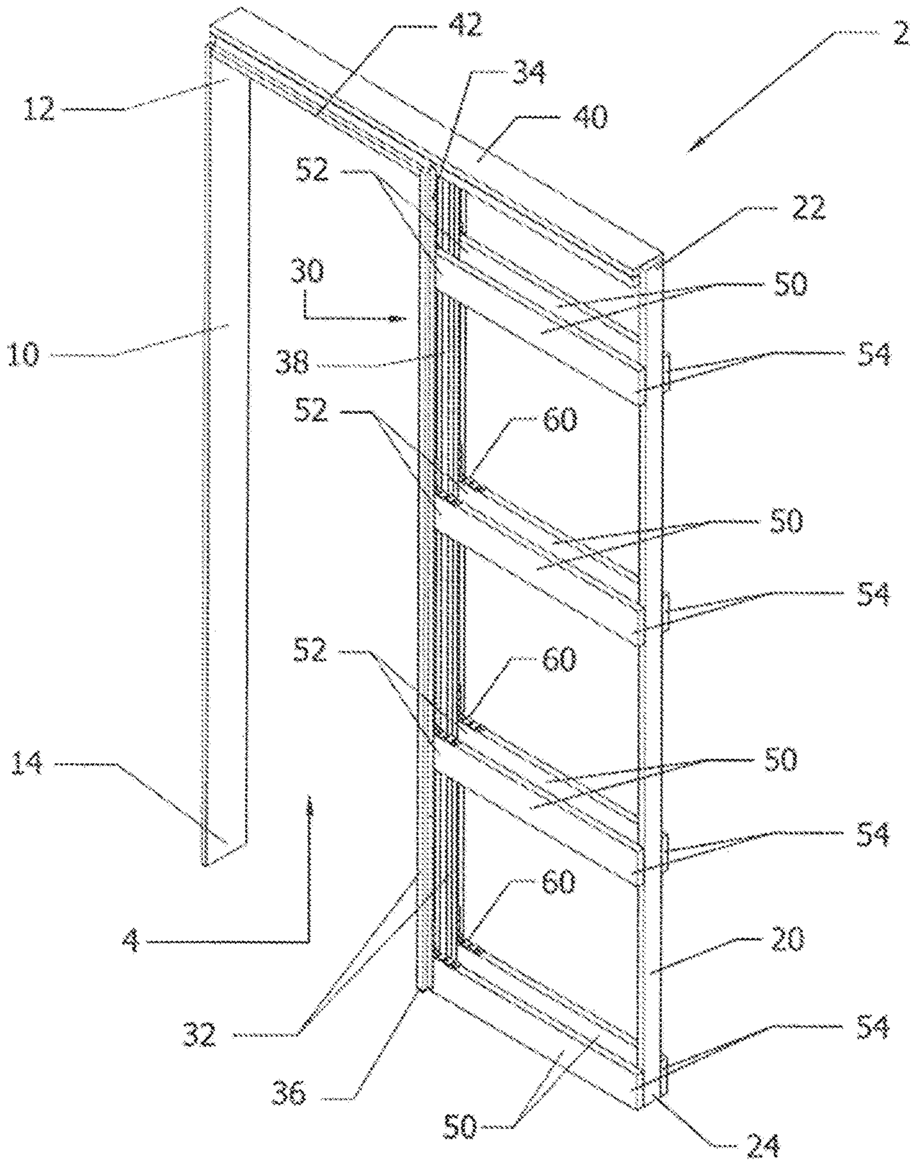
FIG. 1 is a perspective view of one embodiment of a preassembled pocket door frame in an installed state in accordance with the present invention.

It is contemplated that the present invention can provide a preassembled pocket door frame that can be quickly and easily installed onsite and which can be collapsed into the smallest possible packaged state in order to reduce shipping, storage and retailing costs.

As will be readily understood by the skilled person, the present invention can be manufactured out of any suitable material including but not limited to galvanized steel, aluminum, wood, PVC and various composite plastics. Moreover, it is contemplated that the components of the present invention can be separate, individual component suitable joined together or alternatively can be a single unitary component as appropriate.

It will also readily appreciated that the components of the present invention can be formed of any suitable manufacturing method including but not limited to milling and planing, 3-D printing, casting, stamping, bending and traditional woodworking among any other suitable manufacturing techniques that will be readily appreciated by the skilled person.

It is contemplated that in at least one embodiment the present invention provides a preassembled pocket door frame having a first vertical member that vertically extends between an upper end and a lower end, a second vertical member that vertical extends between an upper end and a lower end, and an intermediary member that vertically extends between an upper end and a lower end.

It is contemplated that in at least one embodiment the first vertical member and the second vertical member are boards each having an inner surface, an outer surface, a first edge and a second edge.

In at least one embodiment it is contemplated that these components are generally parallel to one another however it is also contemplated that that these components can deviate from perfect verticality or a parallel arrangement as required by the specific end user application of the present invention.

In at least one embodiment it is contemplated that the intermediary component has a vertically extending central slot that extends between the upper end of the intermediary member and the lower end of the intermediary member and is adapted to receive a sliding pocket door.

In some embodiment it is contemplated that the intermediary component is in fact two opposing intermediary members that each extend vertically from an upper end to a lower end. In these embodiments, it is contemplated that the vertically extending central slot is disposed between the two opposing intermediary members. It is contemplated that in at least one embodiment each of the two opposing intermediary members are boards each having an inner surface, an outer surface, a first edge and a second edge.

In some embodiments, it is contemplated that each of the two opposing intermediary members further include two vertically extending stiffening ribs that define a channel therebetween. In at least one embodiment it is contemplated that this channel further includes a vertically extending flat mounting surface. In at least one embodiment, it is contemplated that the two vertically extending stiffening ribs are aligned along outer edges of a surface of each of the two opposing intermediary members.

In at least one embodiment, it is contemplated that the present invention includes an upper member that horizontally extends between the first end of the first vertical member and a first end of the second vertical member. In some embodiments, it is contemplated that the upper member has a lower planar surface that further includes a track component adapted for receiving a tracked sliding door, as will be readily appreciated by the skilled person. In some embodiments, it is contemplated that the upper member further includes at least one trim component that extends horizontally between the upper end of the intermediary member and the upper end of the first vertical member oriented parallelly to the track component extends horizontally between the upper end of the intermediary member and the upper end of the first vertical member. In this way it is contemplated that the trim component can frame the upper edge of a door opening in an aesthetically pleasing way.

In one embodiment it is contemplated that the present invention includes at least a pair of transverse braces. In these embodiments it is contemplated that each transverse brace has a first end and a second end and extends horizontally between the intermediary member and the second vertical member. In some embodiments it is contemplated that each transverse brace is of a fixed length while in other embodiments it is contemplated that each transverse brace is adjustable between a first horizontally compacted position and a second horizontally extended position. In some of these embodiments it is contemplated that the adjustable transverse brace includes a first horizontally extending male component that fits within a second horizontally extending female component. In some embodiments the male component is a first tube that interfits with the second female component that is a hollow tube. In other embodiments it is contemplated that the female component includes a channel that receives the male component.

In some embodiments it it is contemplated that each transverse brace has a moveable coupler mounted to at least one of the first end of the transverse brace and the second end of the transverse brace. It is contemplated that the movable coupler is operable such that each transverse brace is movable from a first, stowed position to a second, generally orthogonal position where each transverse brace is oriented generally orthogonally to the intermediary member and the second vertical member and one of the first end of the transverse brace and the second end of the transverse brace abuts the second vertical member and the other of the first end of the transverse brace and the second end of the transverse brace abuts the intermediary member in the second, generally orthogonal position.

A wide variety of suitable moveable couplers are contemplated. In one embodiment the moveable coupler is a hinge such as a side-rail hinge. In other embodiments, it is contemplated that the moveable coupler could be a keyhole hanger wherein an asymmetrical male component is received in a correspondingly asymmetrical female component or a dowel and bore joint where a circular dowel component is received in a corresponding circular bore, as will be discussed in further detail herein. Moreover, it is contemplated that the present invention can employ multiple pairs of transverse braces wherein different moveable couplers are utilized for each pair of transverse braces.

In this way, it will be readily understood that the cross braces can be easily stowed in the first position and the first member, second member, intermediary member, upper member and cross braces can be tightly packaged together into the smallest possible packaged state in order to reduce shipping, storage and retailing costs while still being quickly and easily installed onsite in a predicatable and precise manner.

Turning to FIG. 1, at least one embodiment of a preassembled pocket door frame in accordance with the present invention is illustrated. In this embodiment, pocket door frame 2 defines a door opening 4 and includes a first vertical member 10 extending vertically between an upper end 12 and a lower end 14, a second vertical member 20 extending between and upper end 22 and a lower end 24 and an intermediary member 30. In this embodiment, intermediary member 30 is two opposing intermediary members 32 each vertically extending between an upper end 34 and a lower end 36 and defining a vertically extending slot 38 therebetween.

In this embodiment, pocket door frame 2 includes an upper member 40 that horizontally extends between the first end 12 of first vertical member 10 and the first end 22 of the second vertical member 20. In this embodiment, upper member 40 has a lower planar surface (not shown) that further includes a track component (not shown) adapted for receiving a tracked sliding door (not shown). Moreover, in this embodiment upper member 40 includes at least one trim component 42 that extends horizontally between the upper ends 34 of each intermediary members 32 and the upper end 12 of the first vertical member 10 in order to provide an aesthetic upper edge of the door opening 4.

In this embodiment, pocket door frame 2 includes at least one pair of transverse braces 50 that each extend horizontally between a first end 52 and a second end 54. In this embodiment the first ends 52 abut the intermediary members 32 and the second ends 54 abut the second vertical member 20.

It is contemplated that at least one of the first end 52 and the second end 54 of each transverse brace 50 further includes a moveable coupler 60. In this embodiment the moveable coupler 60 is a hinge, however other arrangements are also contemplated as will be discussed herein.

Figure 2:
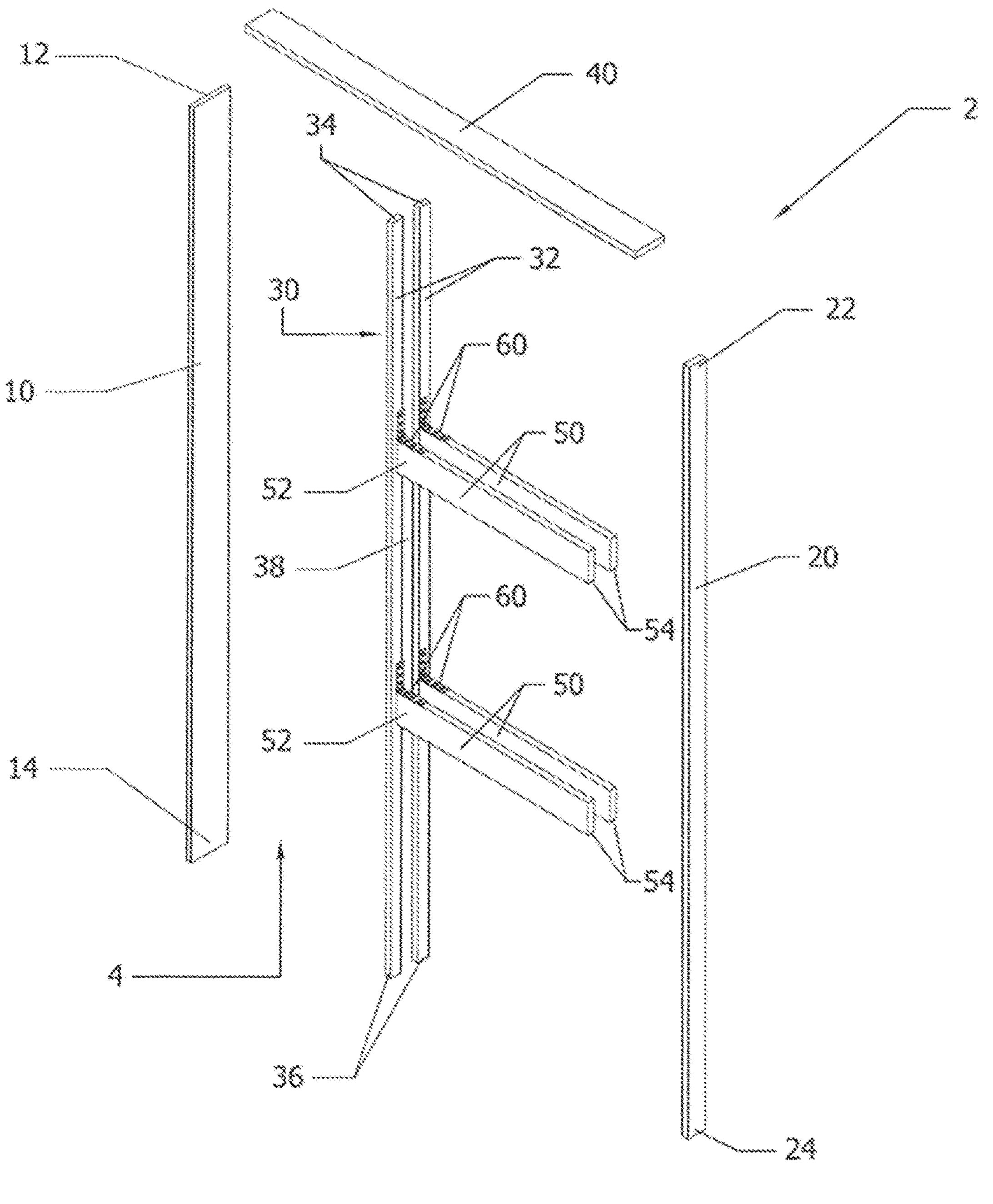
FIG. 2 is an exploded view of the preassembled pocket door frame of FIG. 1.
Figure 3:
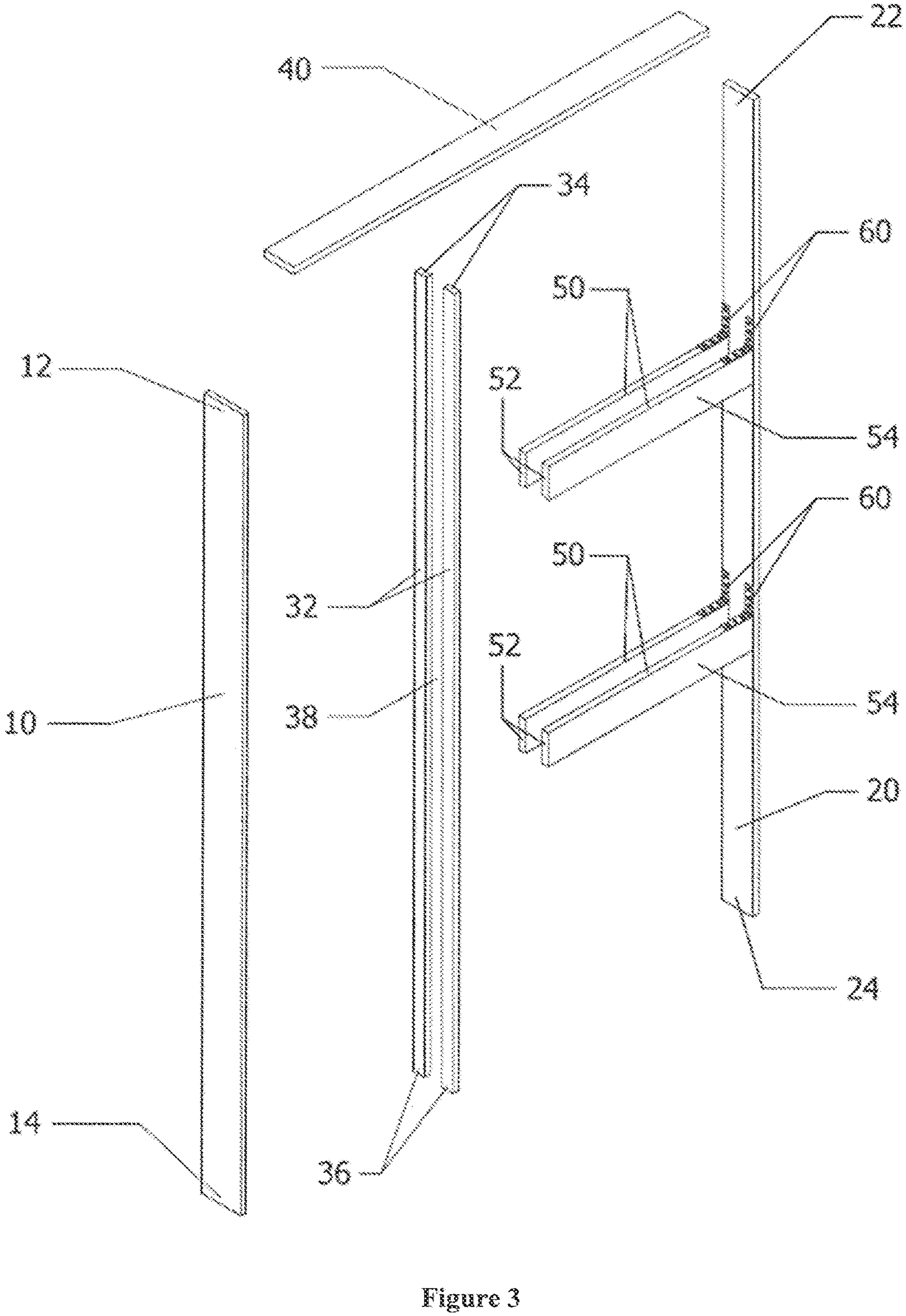
FIG. 3 is an exploded view of another embodiment of a preassembled pocket door frame in accordance with the present invention.

Turning to FIGS. 2 and 3, at least one embodiment of a preassembled pocket door frame in accordance with the present invention is illustrated. In this embodiment, pocket door frame 2 defines a door opening 4 and includes a first vertical member 10 extending vertically between an upper end 12 and a lower end 14, a second vertical member 20 extending between and upper end 22 and a lower end 24 and an intermediary member 30. In this embodiment, intermediary member 30 is two opposing intermediary members 32 each vertically extending between an upper end 34 and a lower end 36 and defining a vertically extending slot 38 therebetween.

In this embodiment, pocket door frame 2 includes an upper member 40 that horizontally extends between the first end 12 of first vertical member 10 and the first end 22 of the second vertical member 20.

In this embodiment, pocket door frame 2 includes at least one pair of transverse braces 50 that each extend horizontally between a first end 52 and a second end 54. In this embodiment the first ends 52 abut the intermediary members 32 and the second ends 54 abut the second vertical member 20, however it is also contemplated that the first ends 52 abut the second vertical member 20 and the second ends 54 abut the intermediary members 32 as seen in FIG. 3.

It is contemplated that at least one of the first end 52 and the second end 54 of each transverse brace 50 further includes a moveable coupler 60. In this embodiment the moveable coupler 60 is a hinge, however other arrangements are also contemplated as will be discussed herein.

Figure 4:
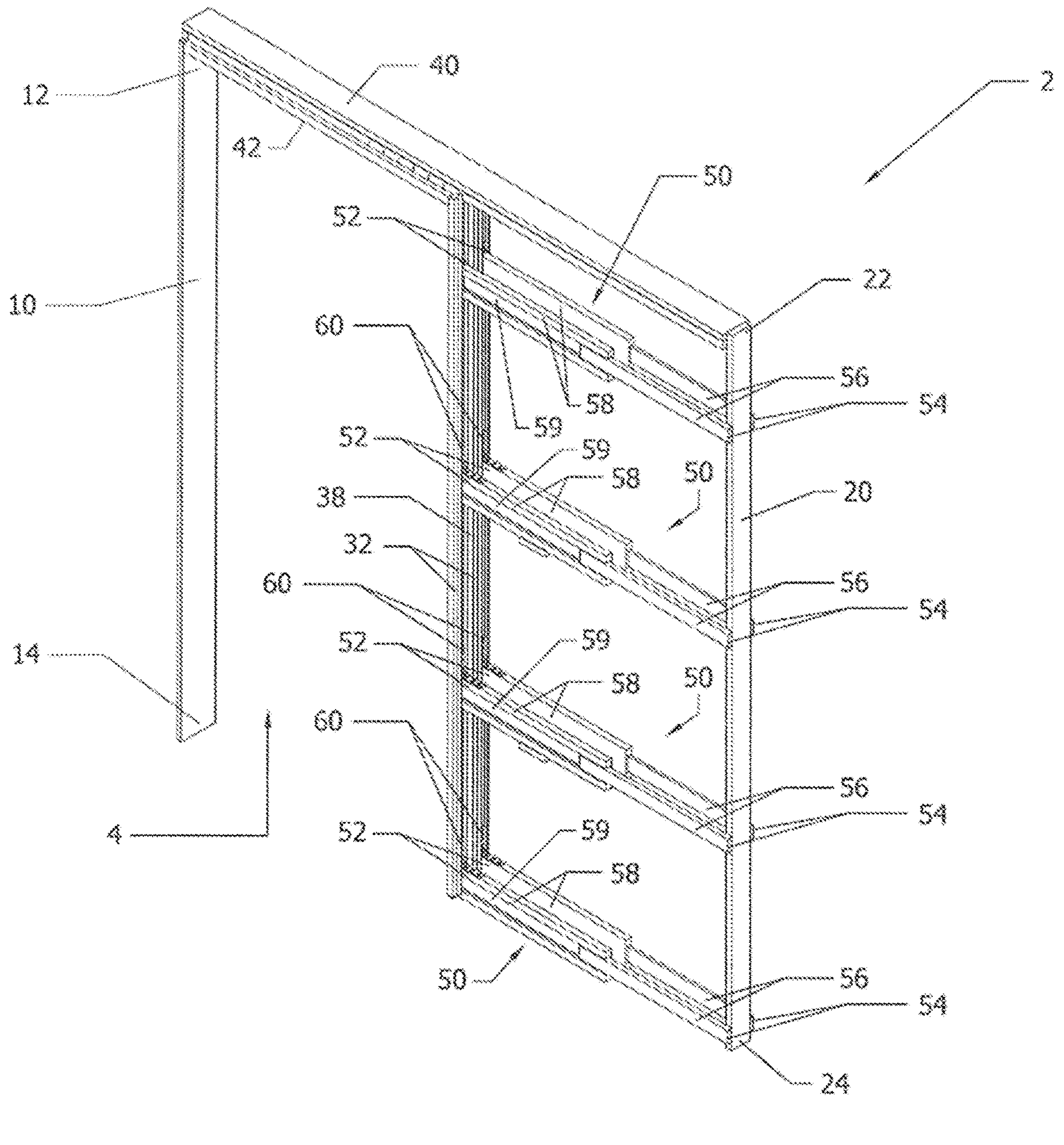
FIG. 4 is perspective view of another embodiment of a preassembled pocket door frame in an installed state in accordance with the present invention.

Turning to FIG. 4, at least one embodiment of a preassembled pocket door frame in accordance with the present invention is illustrated. In this embodiment, pocket door frame 2 defines a door opening 4 and includes a first vertical member 10 extending vertically between an upper end 12 and a lower end 14, a second vertical member 20 extending between and upper end 22 and a lower end 24 and an intermediary member 30. In this embodiment, intermediary member 30 is two opposing intermediary members 32 each vertically extending between an upper end 34 and a lower end 36 and defining a vertically extending slot 38 therebetween.

In this embodiment, pocket door frame 2 includes an upper member 40 that horizontally extends between the first end 12 of first vertical member 10 and the first end 22 of the second vertical member 20. In this embodiment, upper member 40 has a lower planar surface (not shown) that further includes a track component (not shown) adapted for receiving a tracked sliding door (not shown). Moreover, in this embodiment upper member 40 includes at least one trim component 42 that extends horizontally between the upper ends 34 of each intermediary members 32 and the upper end 12 of the first vertical member 10 in order to provide an aesthetic upper edge of the door opening 4.

In this embodiment, pocket door frame 2 includes at least one pair of transverse braces 50 that each extend horizontally between a first end 52 and a second end 54. In this embodiment the first ends 52 abut the intermediary members 32 and the second ends 54 abut the second vertical member 20. In this embodiment each transverse brace 50 is an adjustable brace that has a first horizontally extending male component 56 that is received in a second horizontally extending female component 58. In this embodiment, female component 58 includes a longitudinally extending, centrally oriented channel 59 that is adapted to receive male component 56.

It is contemplated that at least one of the first end 52 and the second end 54 of each transverse brace 50 further includes a moveable coupler 60. In this embodiment the moveable coupler 60 is a hinge, however other arrangements are also contemplated as will be discussed herein.

Turning to FIGS. 5 and 6, at least one embodiment of an intermediary member 30 is illustrated. In this embodiment, intermediary member 30 is two opposing intermediary members 32 each vertically extending between an upper end 34 and a lower end 36 and defining a vertically extending slot 38 therebetween. In this embodiment, each of the two opposing intermediary members 32 further includes a longitudinally extending stiffening rib 70 that define a longitudinally extending channel 72 therebetween. Furthermore, it is contemplated that channel 72 includes a longitudinally extending flat mounting surface 74.

In this embodiment, it is contemplated that at least one pair of transverse braces 50 is included that each extend horizontally between a first end 52 that is a second horizontally extending female component 58. In this embodiment, the female component includes a longitudinally extending, centrally oriented channel that is adapted to receive a male component (not shown).

Figure 6A:
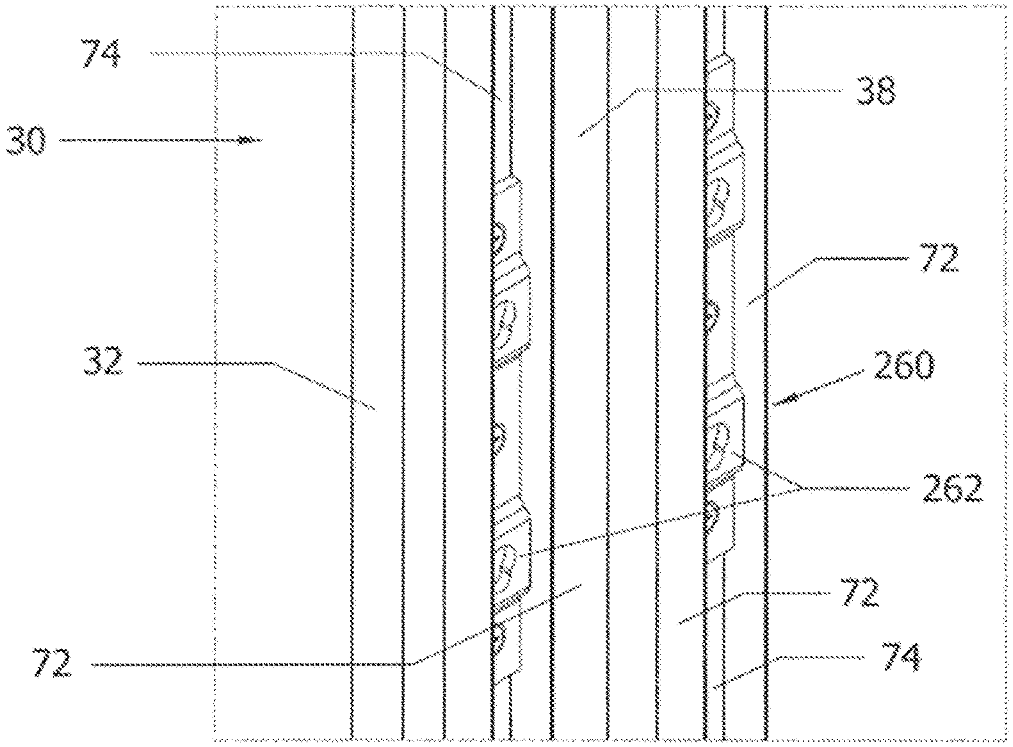
FIGS. 6A and 6B are close-up views of two embodiments of a moveable coupler for a transverse brace member of a preassembled pocket door frame in accordance with the present invention.
Figure 6B:
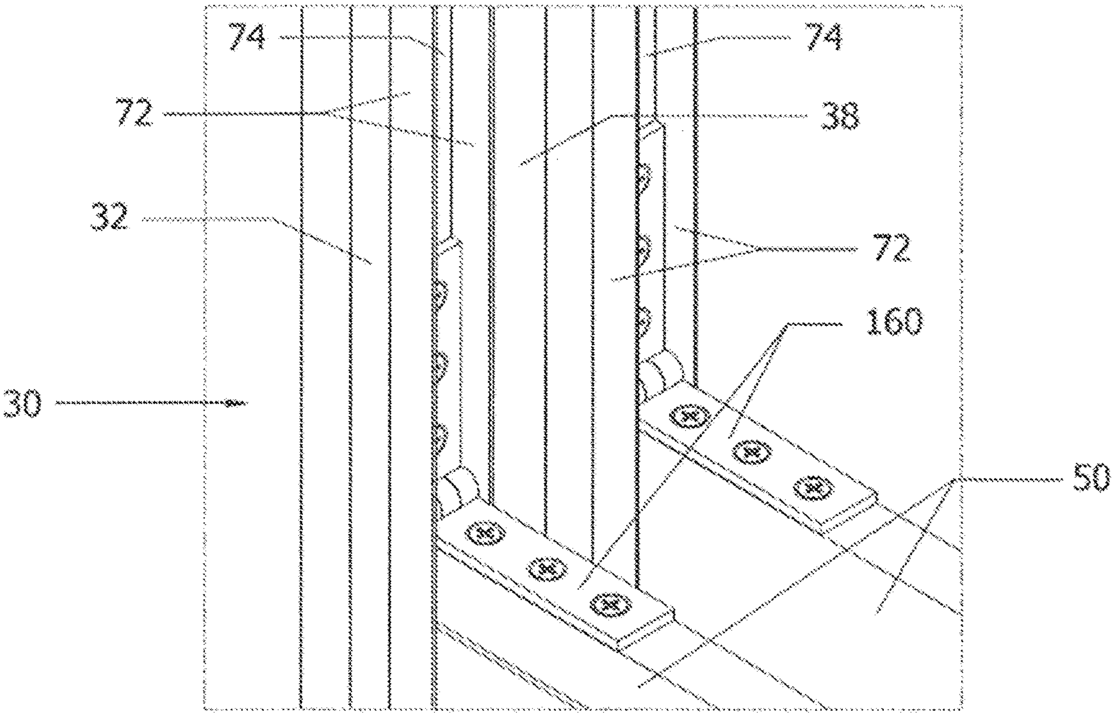

With reference to FIGS. 6A and 6B, a close-up view of the longitudinally extending stiffening rib 70, longitudinally extending channel 72 and longitudinally extending flat mounting surface 74 is illustrated. As can be seen, longitudinally extending stiffening rib 70 extending vertically along each intermediary member 32 defines a longitudinally extending channel 72 therebetween. Channel 72 further includes a longitudinally extending flat mounting surface 74. Moreover, in this embodiment moveable coupler 60 is mounted to the longitudinally extending flat mounting surface 74.

As discussed herein, it is contemplated that moveable coupler 60 can take a variety of forms. In one embodiment it is contemplated that the moveable coupler is a hinge 160 that is fixed to mounting surface 74 and one end of the transverse brace 50. In other embodiments, it is contemplated that the moveable coupler 60 is a keyhole hanger assembly 260 fixed to mounting surface 74 wherein the keyhole hanger assembly 260 includes an eccentric male component (not shown) is received in an eccentric female bore 262. In some embodiments, it is contemplated that multiple types of moveable couplers 60 (i.e.: both a hinge 160 and a keyhole hanger assembly 260) are incorporated into a single embodiment of a preassembled pocket door frame in accordance with the present invention.

Figure 5A:
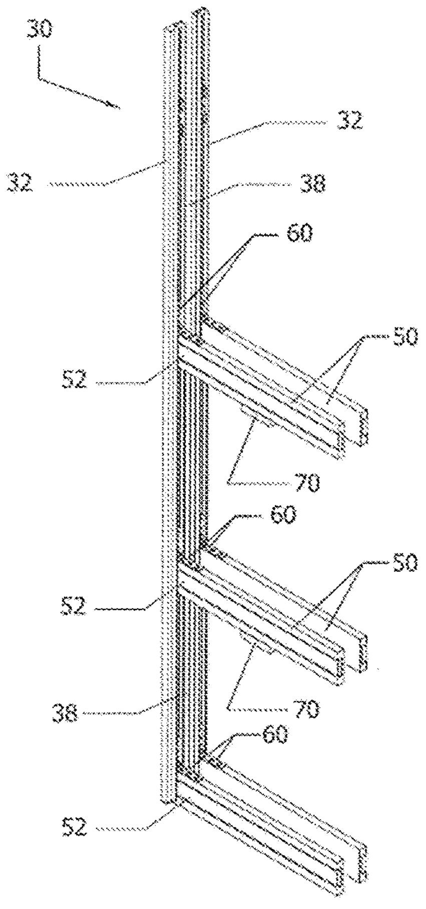
FIGS. 5A and 5B are perspective views of one embodiment of an intermediary member of a preassembled pocket door frame in as first, stowed position and a second, generally orthogonal position in accordance with the present invention.
Figure 5B:
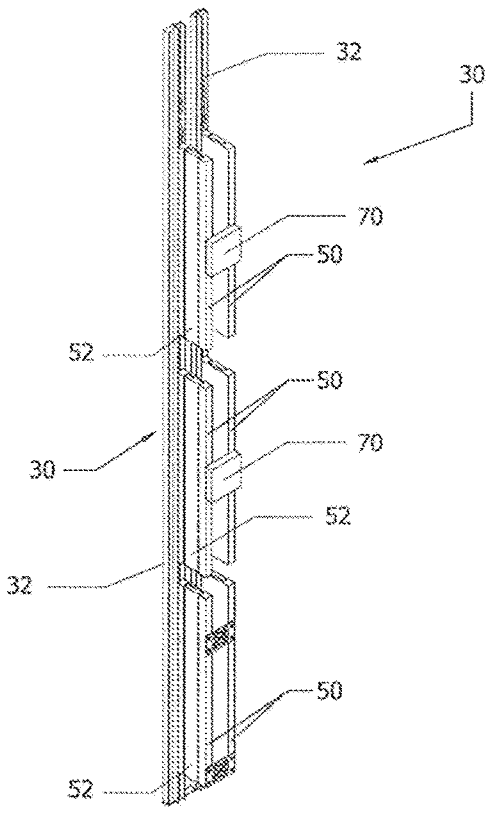

In this way, it is contemplated that moveable coupler 60 is operable such that each transverse brace 50 is movable from a first, stowed position to a second, generally orthogonal position where each transverse brace 50 is oriented generally orthogonally to the intermediary member 30 and and one of the first end 52 of the transverse brace 50 and the second end of the transverse brace 54 abuts the mounting surface 74 of the intermediary member 30 in the second, generally orthogonal position as can be seen in FIGS. 5A and 5B.

Moreover, in this embodiment it is contemplated that temporary transportation blocks 70 are temporarily fixed to the pair of transverse braces 50 in order to ensure that the transverse braces 50 are not twisted or otherwise damage during transit, storage and installation. As will be readily understood by the skilled person, temporary transportation blocks 70 can be readily removed once the installation of preassembled pocket door frame 2 is finalized and a suitable sliding door is installed.

Figure 7:
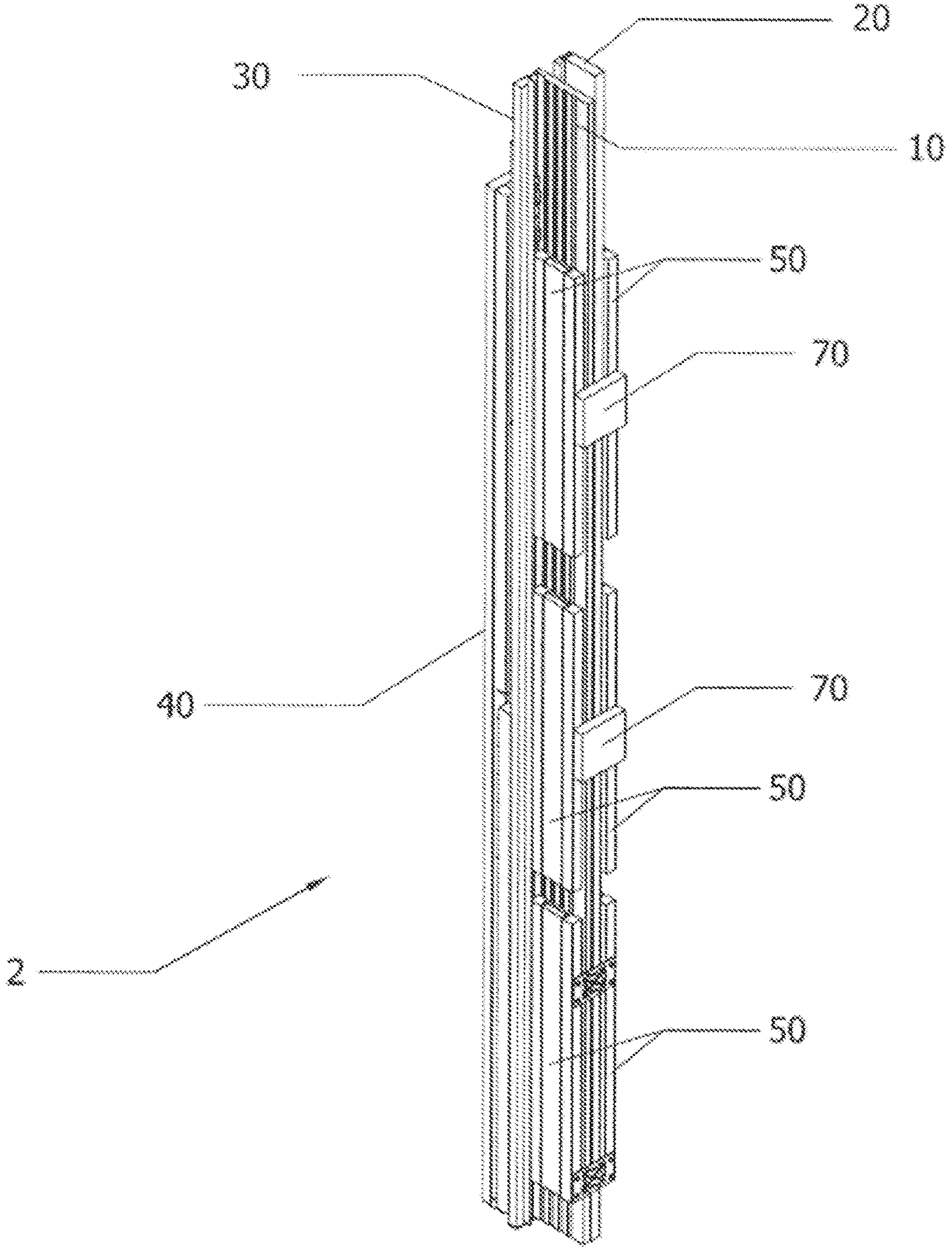
FIG. 7 is a perspective view of one embodiment of a preassembled pocket door frame in accordance with the present invention.
Figure 8:
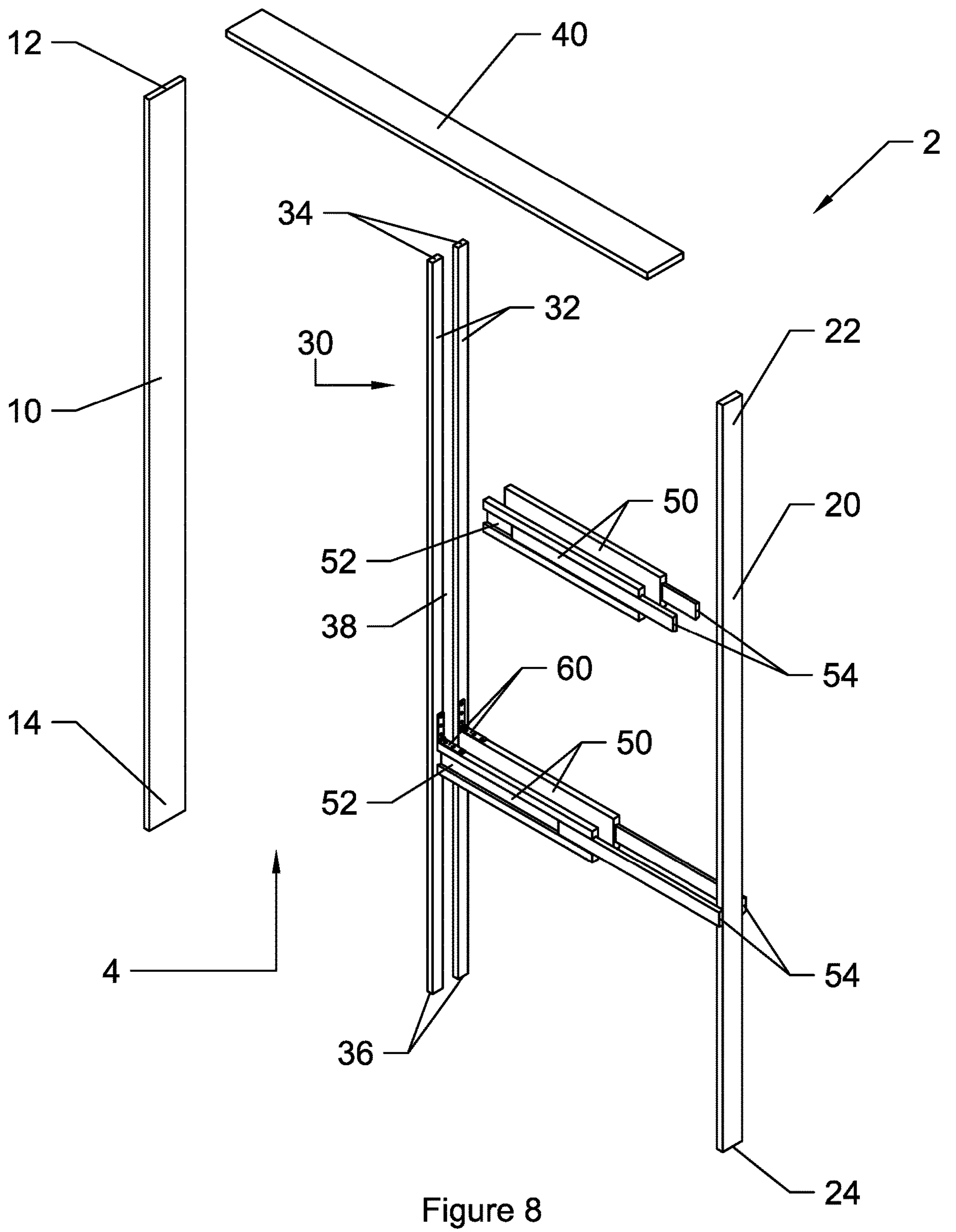
FIG. 8 is an exploded view of another embodiment of a preassembled pocket door frame in accordance with the present invention.

Turning the FIG. 7, at least one embodiment of a preassembled pocket door frame in accordance with the present invention is illustrated in a collapsed state. In this embodiment, preassembled pocket door frame 2 includes a first vertical member 10, a second vertical member 20, an intermediary member 30 and an upper member 40. In this embodiment, intermediary member 30 includes a number of pairs of transverse braces 50 that are temporarily secured together by temporary transportation blocks 70 and attached to intermediary member 30 by a moveable coupler (not shown) that is operable to are moveable into a first, stowed position.

In this way, it is contemplated that the present invention can provide a preassembled pocket door that can be quickly and easily installed onsite and which can be collapsed into the smallest possible packaged state in order to reduce shipping, storage and retailing costs.

While the present invention has been described with reference to particular embodiments it will be apparent to anyone skilled in the art that there are many permutations and combinations of combining the primary response variables to achieve particular benefits. All such permutations and combinations are considered to be within the sphere and scope of this invention as defined in the claims appended hereto.

What is claimed is:

1. A preassembled pocket door frame comprising:

a first vertical member vertically extending between an upper end and a lower end;

a second vertical member vertically extending between an upper end and a lower end;

an intermediary member vertically extending between an upper end and a lower end and having a vertically extending central slot, the vertically extending central slot extending between the upper end of the intermediary member and the lower end of the intermediary member;

an upper member horizontally extending between the first end of the first vertical member and a first end of the second vertical member; and at least a pair of transverse braces, each one of the pair of transverse braces having a first end and a second end and extending horizontally between the intermediary member and the second vertical member, the first end of the one of the at least a pair of transverse braces having a perpendicularly oriented end surface, each one of the at least a pair of transverse braces having a moveable coupler mounted to the first end of each of the at least a pair of transverse braces, the movable coupler operable such that each one of the at least a pair of transverse braces is movable from a first stowed position to a second generally orthogonal position, each one of the at least a pair of transverse braces oriented in a parallel manner to the intermediary member in the first stowed position, the movable coupler of each one of the at least a pair of transverse braces secured to the first end of each of the at least a pair of transverse braces and the intermediary member;

wherein the second end of the one of the at least a pair of transverse braces abuts the second vertical member and the first end of the one of the at least a pair of transverse braces abuts the intermediary member in the second generally orthogonal position such that the perpendicularly oriented end surface of the first end of the one of the at least a pair of transverse braces abuts the intermediary member at a position between the upper end of the intermediary member and the lower end of the intermediary member;

wherein the preassembled pocket door frame is movable from a first packed position to a second installed position, the at least a pair of transverse braces oriented in the first stowed position when the preassembled pocket door frame is in the first packed position, the at least a pair of transverse braces oriented in the second generally orthogonal position when the preassembled pocket door frame is in the second installed position; and wherein the first vertical member, the second vertical member, the intermediary member, the upper member and the at least a pair of transverse braces are parallelly oriented to one another in the first, packed position.

2. The preassembled pocket door frame of claim 1 wherein at least one movable coupler is a hinge.

3. The preassembled pocket door frame of claim 1 wherein at least one movable coupler is a keyhole hanger assembly.

4. The preassembled pocket door frame of claim 1 wherein at least one movable coupler is a dowel and bore arrangement.

5. The preassembled pocket door frame of claim 1 wherein the intermediary member is two opposing intermediary members, the central slot disposed between the two opposing intermediary members.

6. The preassembled pocket door frame of claim 5 wherein each of the two opposing intermediary members further comprises a pair of vertical extending stiffening ribs, the pair of vertical extending stiffening ribs defining a channel therebetween having a vertically extending flat mounting surface.

7. The preassembled pocket door frame of claim 6 wherein the moveable coupler of each transverse brace is securely mounted to the vertically extending flat mounting surface.

8. The preassembled pocket door frame of claim 1 wherein the upper member has a lower planar surface, the lower planar surface further including a track component adapted for receiving a tracked sliding door.

9. The preassembled pocket door frame of claim 8 wherein the lower planar surface further comprises at least one trim component, the at least one trim component oriented parallelly to the track component, the at least one trim component extending horizontally between the upper end of the intermediary member and the upper end of the first vertical member.

10. The preassembled pocket door frame of claim 1 wherein at least one pair of transverse braces is horizontally adjustable between a first horizontally compacted position and a second horizontally extended position, each of the at least one pair of transverse braces has a first horizontally extending male component that fits within a second horizontally extending female component, the first horizontally extending male component horizontally movable relative to and within the second horizontally extending female component between the first horizontally compacted position and the second horizontally extended position.

11. The preassembled pocket door frame of claim 10 wherein the first male component is a first tube and the second female component is a second hollow tube, the first tube interfitting within the second hollow tube.

12. The preassembled pocket door frame of claim 10 wherein the second female component includes a central channel that receives the male component.

13. The preassembled pocket door frame of claim 1 wherein the at least a pair of transverse braces further comprise at least one removable lateral brace, the at least one removeable lateral brace extending laterally from one of the each at least a pair of transverse braces to the other of each at least a pair of transverse braces.

14. A pocket door kit comprising:

a track component; and a sliding door, the sliding door being generally planar and having an upper surface including a track, the track adapted to slidingly engage with the track component;

a preassembled pocket door frame having a first vertical member vertically extending between an upper end and a lower end;

a second vertical member vertically extending between an upper end and a lower end;

an intermediary member vertically extending between an upper end and a lower end and having a vertically extending central slot, the vertically extending central slot extending between the upper end of the intermediary member and the lower end of the intermediary member;

an upper member horizontally extending between the first end of the first vertical member and a first end of the second vertical member; and at least a pair of transverse braces, each one of the pair of transverse braces having a first end and a second end and extending horizontally between the intermediary member and the second vertical member, the first end of the one of the at least a pair of transverse braces having a perpendicularly oriented end surface, each one of the at least a pair of transverse braces having a moveable coupler mounted to the first end of each of the at least a pair of transverse braces, the movable coupler operable such that each one of the at least a pair of transverse braces is movable from a first stowed position to a second generally orthogonal position, each one of the at least a pair of transverse braces oriented in a parallel manner to the intermediary member in the first stowed position, the movable coupler of each one of the at least a pair of transverse braces secured to the first end of each of the at least a pair of transverse braces and the intermediary member;

wherein the second end of the one of the at least a pair of transverse braces abuts the second vertical member and the first end of the one of the at least a pair of transverse braces abuts the intermediary member in the second generally orthogonal position such that the perpendicularly oriented end surface of the first end of the one of the at least a pair of transverse braces abuts the intermediary member at a position between the upper end of the intermediary member and the lower end of the intermediary member; and wherein the preassembled pocket door frame is movable from a first packed position to a second installed position, the at least a pair of transverse braces oriented in the first stowed position when the preassembled pocket door frame is in the first packed position, the at least a pair of transverse braces oriented in the second generally orthogonal position when the preassembled pocket door frame is in the second installed position, the first vertical member, the second vertical member, the intermediary member, the upper member and the at least a pair of transverse braces are parallelly oriented to one another in the first, packed position.

* * * * *